United States Patent [19]

Faul et al.

[11] 4,159,309

[45] Jun. 26, 1979

[54] PROCESS FOR THE CATALYTIC REDUCTION OF REDUCIBLE COMPOUNDS IN SOLUTION

[75] Inventors: Wolfgang Faul, Jülich; Bertel Kastening, Hamburg, both of Fed. Rep. of Germany

[73] Assignee: Kernforschungsanlage Jülich Gesellschaft mit beschränkter Haftung, Jülich, Fed. Rep. of Germany

[21] Appl. No.: 889,727

[22] Filed: Mar. 24, 1978

[30] Foreign Application Priority Data

Mar. 30, 1977 [DE] Fed. Rep. of Germany ....... 2714074
Apr. 20, 1977 [DE] Fed. Rep. of Germany ....... 2717368

[51] Int. Cl.² .......................... C01B 21/00; C01C 1/00
[52] U.S. Cl. ........................................ 423/53; 75/108; 75/109; 210/42 R; 423/352; 423/395
[58] Field of Search ................... 75/109, 108, 118 R; 210/42 R; 423/53, 23, 395, 352; 252/444, 443

[56] References Cited

U.S. PATENT DOCUMENTS

| 3,369,886 | 2/1968 | Metzger et al. ..................... 75/0.5 A |
| 3,406,011 | 10/1968 | Zirngibl et al. .................. 252/444 X |
| 3,788,833 | 1/1974 | Short ................................... 75/0.5 A |
| 3,957,506 | 5/1976 | Lundquist et al. ..................... 75/108 |
| 4,073,866 | 2/1978 | Yamaki et al. .................... 252/443 X |

*Primary Examiner*—G. Ozaki
*Attorney, Agent, or Firm*—William R. Woodward

[57] ABSTRACT

Reducible pollutants can be detoxified by reduction and metals can be recovered by reduction of the corresponding metal ions by bringing into contact a catalyst with the solution which is suitable for the electrochemical reduction of the ions in question, and mixing into the solution (or bubbling therethrough in the case of a gas) a reducing agent that has a redox potential in the redox system of the reducing agent and its oxidation product that is more negative than the redox potential of the substance to be reduced and its reduction product. The catalyst is a material that is suitable for use as an anode material at which hydrogen can be oxidized in a fuel cell. Such catalysts include finely divided platinum, activated carbon coated with platinum, tungsten carbide and activated carbon coated with tungsten carbide, particularly. Hydrogen is a good reducing agent for the purpose.

4 Claims, No Drawings

PROCESS FOR THE CATALYTIC REDUCTION OF REDUCIBLE COMPOUNDS IN SOLUTION

This invention concerns a process for the reduction of reducible pollutants, particularly chromates and nitrites in aqueous solution, by the addition of reducing agents.

Chromates are most widely recognized as pollutants that can be detoxified by reduction. Chromate-containing solutions result, for example, from the process of plating metals to protect them from corrosion. Because of the toxic effect of the chromates, water solutions that contain these pollutants must be purified before leading them away in sewers or in natural water courses. It is known to treat waste water containing chromates by the addition of reducing agents such as sodium sulfite to reduce the chromate to chromium$^{III}$ ions, and then to precipitate the latter as chromium hydroxide by neutralization of the water solution. In addition to the amount of chemicals necessary for this process, the process has the disadvantage of greatly increasing the salinity of the waste water in the process of detoxification.

Another pollutant that is detoxifiable by reduction is sodium nitrite, for example, as it occurs in waste water from hardening shops where there are tempering baths and the like. Sodium nitrite, however, is more often oxidized by reaction with hypochlorite in practice than reduced. That treatment, however, in addition to increasing the salinity of the waste water, has the disadvantage that hypochlorite itself has a toxic effect and any excess proportion must be avoided.

It is an object of the invention to provide a process for the reduction of such reducible pollutants in water solution without substantial increase in the salinity of the treated solutions, and with a sufficient detoxification rate for economic purposes, with the addition of such chemicals as produce no toxic effects either themselves or through their reaction products.

SUMMARY OF THE INVENTION

Briefly, the reducing agent provided to an aqueous solution of a chromate or a nitrite (referred to below as "waste material") is one that has a redox potential in the redox system of reducing agent/oxidation product of the reducing agent that is more negative than the redox potential of the redox system waste material/reduction product of the waste material, the waste material being a compound that in many cases is a noxious pollutant. A suitable catalyst is also provided for the electrochemical oxidation of the reducing agent and for the electrochemical reduction of the waste material. Advantageously, according to the invention, the reduction of the waste material in aqueous solution is accomplished by the addition of a reducing agent that is so chosen with regard to the known redox potential of the redox system waste material/reduction product of the waste material, that it provides, a catalyst promoting the electrochemical oxidation of the reducing agent and the electrochemical reduction of the waste material, a conversion potential that is more negative than the redox potential of the aforesaid redox system for the waste material. This can be done if a reducing agent is selected that has a redox potential, in the redox system reducing agent/oxidation product of the reducing agent, that is itself more negative than the redox potential of the waste material redox system. Typically, hydrogen is such a reducing agent for chromates or nitrites. Other reducing agents to be considered on the foregoing basis are methanol and formaldehyde. Then at the same time the waste material will be reduced and the reducing agent oxidized, so that the reaction will proceed stoichiometrically. The catalyst formed as a loose mass of particles dispersively floats in the water solution. Alternatively the catalyst is formed as a porous body and the solution containing the reducing agent and the waste material is caused to flow by or around the catalyst body.

A relatively rapid detoxification of an aqueous solution containing chromate or nitrite is obtained if a material used as the catalyst is one which is known to be suitable for the composition of an anode at which hydrogen is oxidized in a fuel cell. In such a case, hydrogen is preferred as the reducing agent in the water solution. Platinum or activated carbon coated with platinum is suitable as a catalyst. For economic reasons, however, tungsten carbide is advantageously used. Large catalyst surfaces per unit of volume are then provided if the catalyst used in water solution is activated carbon that is first soaked in a tungsten salt solution and then calcined in a hydrogen atmosphere at a temperature of 1000° C. for the formation of tungsten carbide (WC). The choice of the material usable as a catalyst is made essentially with regard to the chemical compatibility of the acidity or alkalinity that may be exhibited by the aqueous solution, with regard to the particular waste material to be reduced, and the particular reduction product in question, as well as with regard to economic considerations. For alkaline solutions, silver and/or nickel are suitable as catalysts.

The invention is further described by way of illustrative examples.

EXAMPLE 1

Chromate ions in aqueous solution were reduced with hydrogen by means of activated carbon coated with platinum. The redox potential with respect to a normal hydrogen electrode for the redox system chromium$^{VI}$ ions/chromium$^{III}$ ions lies, corresponding to the following equation (1), at E°= +1.1 V.

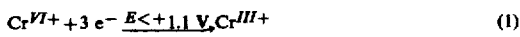  (1)

A suitable reducing agent according to the invention for addition to the aqueous solution must have a redox potential that is more negative than E° = +1.1 V. This is the case, for example, for hydrogen, of which the redox potential under the same conditions, according to equation (2) lies at E°=0 V.

  (2)

Tungsten carbide is used as a well-suited catalyst for the electrochemical oxidation of hydrogen. After the addition of tungsten carbide to the aqueous solution, the solution having previously been brought to a pH value of 1 with sulfuric acid, hydrogen was introduced. A conversion potential was thereby established at the catalyst in the acid solution and in the presence of hydrogen and chromium$^{VI}$ ions, at which potential, without any external electrical connection, there simultaneously took place the reduction of chromium$^{VI}$ ions and the oxidation of hydrogen in a quantity that was stoichiometric with respect to the following equation.

  (3)

EXAMPLE 2

Nitrite ions contained in aqueous solution were reduced to ammonium ions by means of activated carbon powder coated with platinum.

The redox potential relative to a normal hydrogen electrode for the reduction of nitrite ions to ammonium ions lies at $E° = +0.764$ V. Reduction of nitrite ions to ammonium ions is accordingly possible according to equation (4) with the injection of a reducing agent of which the redox system has a more negative redox potential than $E° = +0.764$ V.

$$NO_2^- + 8H^+ + 6e^- \xrightarrow{E \leq 0.764\ V} NH_4^+ + 2H_2O \qquad (4)$$

In the same manner as in Example 1, hydrogen was used as the reducing agent.

As the catalyst, activated carbon powder was provided that had been coated with platinum to the extent of 5% by weight with reference to the amount of activated carbon powder. 5 g of the coated activated carbon powder was suspended in 100 cm³ of 1 N sulfuric acid. A potential of 0 V with respect to the normal hydrogen electrode was established at the catalyst upon passing of the hydrogen gas through the water solution. 2 g of sodium nitrite was added to the aqueous solution, corresponding to a concentration of 20 g per liter. The potential with respect to the normal hydrogen electrode thereupon rose to a value of 0.91 V. At the catalyst, there occurred, without any external electrical circuit connections, simultaneously the reduction of sodium nitrite to ammonium and the oxidation of hydrogen in stoichiometric quantity, while the established potential was simultaneously influenced by the redox system at the catalyst described in equation (5).

$$NO + H_2O \rightleftharpoons HNO_2 + H^+ + e^-; E° = +1.0\ V \qquad (5)$$

In the course of the reaction, the potential first rose steadily and then suddenly dipped and established itself after 65 minutes back at 0 V.

EXAMPLE 3

Sodium nitrite in aqueous solution was reduced with the use of a tungsten carbide catalyst.

5 g of activated carbon powder that had been coated with tungsten carbide was suspended in 100 cm³ of a buffer solution having a pH value of 3. The tungsten carbide coating was provided in this case by soaking the active carbon powder in a tungsten salt solution and then calcining it at a temperature of 1000° C. in a hydrogen atmosphere to form tungsten carbide. The tungsten content on the activated carbon corresponded to 10% by weight. Hydrogen was passed through the aqueous solution, and as this took place, a potential of $+0.16$ V was established relative to a normal hydrogen electrode. 2 g of sodium nitrite, corresponding to a concentration of 20 g per liter, was added, whereupon the potential relative to the normal hydrogen electrode rose to 0.24 V. In the course of the reaction the potential fell steadily and after about 12 hours again reached the initial value of $+0.16$ V. Upon analysis of the aqueous solution after the conclusion of the reaction, ammonium ions were detected and nitrite ions could no longer be detected.

EXAMPLE 4

Sodium nitrite in water solution which had been make alkaline was reduced at a platinum catalyst.

It is known that the necessary potential for the oxidation of hydrogen is shifted to negative values in alkaline electrolytes. The oxidation of hydrogen is alkaline electrolytes on a platinum catalyst is possible according to equation (6) at redox potentials that are more positive than $E = -0.83$ V.

$$H_2 + 2\ OH^- \rightleftharpoons 2\ H_2O + 2\ e^-; E° = -0.828\ V. \qquad (6)$$

In 100 cm³ of 1 N sodium hydroxide, 5 g of activated carbon powder that had been coated with platinum to the extent of 5% by weight in the same manner as in Example 2, was suspended to provide a catalyst. Hyrdogen was passed through the solution, whereupon a potential $E = -0.81$ V was established relative to the normal hydrogen electrode. 2 g of sodium nitrite, corresponding to a concentration of 20 g per liter, were added to the aqueous solution. A continuous evolution of ammonia was observed with a simultaneous steady fall of the electrochemical potential. After complete reduction of the nitrite ions, after a lapse of 105 minutes, the starting potential of $E = -0.81$ V was again reached.

EXAMPLE 5

A cylinder as described in example 13 was dipped in a solution of the same volume containing sulfuric acid (pH 1), chromate ions (0.8 g/l) and copper ions (0.085 g/l). While hydrogen was bubbling through the cylinder, the chromate and copper concentration in the solution is decreased to less than 1 mg/l within 30 minutes. The copper was deposited on the surface of the cylinder and chromate ions were reduced to chromium$^{III}$ ions.

Although the invention has been described with reference to a number of illustrative examples, it will be understood that still further variations and modifications are possible within the inventive concept, either in the case of detoxification of polluted waters, or recovery of valuable dissolved metals, or both.

Reference is made to "Fuel Cells" by Wolf Vielstich (English translation by Dr. D. J. G. Ives, Wyley, 1968), particularly Section IV.4 entitled "Redox Cells" and Section VIII.2 relating to redox systems for the understanding of redox potentials as applied to electrodes of fuel cells.

We claim:

1. A process for the reduction of reducible pollutant compounds of the group consisting of chromates and nitrites held in aqueous solution, comprising the steps of supplying to said solution a reducing agent having a redox potential in the redox system agent/oxidation product of reducing agent that is more negative than the redox potential of the redox system reducible compound/reduction product of said compound, preparing a catalyst suitable for the electrochemical reduction of said compound and for the electrochemical oxidation of said reducing agent and bringing said catalyst into contact with said solution.

2. A process as defined in claim 1, in which said reducing agent is hydrogen and said catalyst is of a material composition of the kind that is suitable for anodes at which hydrogen is electrochemically oxidizable in a fuel cell.

3. A process as defined in claim 2, in which said catalyst is prepared by the steps of soaking activated carbon particles in a tungsten solution, and thereafter calcining said particles at a temperature of substantially 1000° C. in a hydrogen atmosphere, for the formation of tungsten carbide on the surface of said activated carbon particles.

4. A process as defined in claim 2, in which said catalyst is a substance selected from the group consisting of finely divided platinum, activated carbon coated with platinum, and tungsten carbide.

* * * * *